United States Patent
Green et al.

(10) Patent No.: US 8,761,035 B2
(45) Date of Patent: Jun. 24, 2014

(54) SYSTEM AND METHOD FOR MULTIPLE TIMING MASTERS IN A NETWORK

(75) Inventors: Christopher Green, Austin, TX (US); Claudius Becker, Ubstadt-Weiher (DE); Eric Matthew Ching, Austin, TX (US)

(73) Assignee: SMSC Europe GmbH, Karlsruhe (DE)

( * ) Notice: Subject to any disclaimer, the term of this patent is extended or adjusted under 35 U.S.C. 154(b) by 516 days.

(21) Appl. No.: 12/860,197

(22) Filed: Aug. 20, 2010

(65) Prior Publication Data

US 2011/0044350 A1  Feb. 24, 2011

(30) Foreign Application Priority Data

Aug. 21, 2009  (EP) .................................... 09168391

(51) Int. Cl.
*H04L 12/26* (2006.01)

(52) U.S. Cl.
USPC ........................... 370/252; 370/258; 370/509

(58) Field of Classification Search
USPC ......... 370/324, 503, 507, 509, 510, 511, 512, 370/513, 514
See application file for complete search history.

(56) References Cited

U.S. PATENT DOCUMENTS

| | | | |
|---|---|---|---|
| 3,885,106 A | 5/1975 | Deutsch | |
| 4,224,473 A | 9/1980 | Kaul et al. | |
| 4,346,470 A | 8/1982 | Alvarez, III et al. | |
| 4,587,651 A | 5/1986 | Nelson et al. | |
| 4,910,507 A | 3/1990 | Shimizu et al. | |
| 5,007,051 A | 4/1991 | Dolkas et al. | |
| 5,189,671 A | 2/1993 | Cheng | |

(Continued)

FOREIGN PATENT DOCUMENTS

| | | |
|---|---|---|
| EP | 1189374 | 3/2002 |
| EP | 2045937 | 4/2009 |

(Continued)

OTHER PUBLICATIONS

Office Action mailed Aug. 31, 2010 for U.S. Appl. No. 12/245,005.

(Continued)

*Primary Examiner* — Alvin Zhu
(74) *Attorney, Agent, or Firm* — Kevin L. Daffer; Daffer McDaniel LLP (57) ABSTRACT

A communication system, network, interface, and port architecture are provided for transporting data across a ring network. A network node operating as a first timing master generates a set of frames, each frame having a preamble, a data field and a time count field, which represents a portion of the time information associated with the set of frames. This time information may include counted time units, like seconds, or a number of generated and transmitted over the network. As the individual frames of a set of frames are generated and sent on the network, they pass other network nodes and are forwarded through the ring bus to the first timing master which receives at least a portion of the set it is still generating. This enables a received time count field to be compared with a transmitted time count field of the same set. If the fields are identical, there is no other timing master on the bus. If there is another timing master on the bus, the additional timing master would overwrite the contents of the time count field propagating through the network; therefore, the received time count field would not be equal to the time count field being transmitted by the first timing master.

17 Claims, 3 Drawing Sheets

(56) References Cited

U.S. PATENT DOCUMENTS

| | | | |
|---|---|---|---|
| 5,299,193 | A | 3/1994 | Szczepanek |
| 5,305,317 | A | 4/1994 | Szczepanek |
| 5,321,819 | A | 6/1994 | Szczepanek |
| 5,537,549 | A | 7/1996 | Gee et al. |
| 5,553,095 | A | 9/1996 | Engdahl et al. |
| 5,872,820 | A | 2/1999 | Upadrasta |
| 5,889,781 | A | 3/1999 | Eftimakis et al. |
| 5,907,685 | A | 5/1999 | Douceur |
| 6,101,180 | A | 8/2000 | Donahue et al. |
| 6,308,066 | B1 | 10/2001 | Ranta et al. |
| 6,377,998 | B2 | 4/2002 | Noll et al. |
| 6,470,393 | B1 | 10/2002 | Heinrich et al. |
| 6,487,406 | B1 | 11/2002 | Chang et al. |
| 6,567,422 | B1 * | 5/2003 | Takeguchi et al. ............ 370/503 |
| 6,729,929 | B1 | 5/2004 | Sayers et al. |
| 6,996,387 | B2 | 2/2006 | Chan |
| 6,999,501 | B1 | 2/2006 | Sawyer |
| 7,167,449 | B2 | 1/2007 | Ikeda et al. |
| 7,184,408 | B2 | 2/2007 | Denton et al. |
| 7,230,957 | B2 | 6/2007 | Kang et al. |
| 7,499,500 | B2 | 3/2009 | Page |
| 7,596,378 | B1 | 9/2009 | Nizri et al. |
| 7,603,080 | B2 | 10/2009 | Richenstein et al. |
| 7,908,540 | B2 | 3/2011 | Jeong et al. |
| 2002/0105933 | A1 | 8/2002 | Higuchi |
| 2004/0047424 | A1 | 3/2004 | Ramaswamy et al. |
| 2004/0234000 | A1 | 11/2004 | Page |
| 2008/0198868 | A1 | 8/2008 | Fuehrer |
| 2009/0092210 | A1 * | 4/2009 | Green et al. ................. 375/354 |

FOREIGN PATENT DOCUMENTS

| | | |
|---|---|---|
| WO | 96/37985 | 11/1996 |
| WO | 2005/119951 | 12/2005 |
| WO | 2007/093435 | 8/2007 |

OTHER PUBLICATIONS

Final Office Action mailed Jan. 31, 2011 for U.S. Appl. No. 12/245,005.

Office Action mailed Jan. 4, 2012 for U.S. Appl. No. 12/245,005.

* cited by examiner

SYSTEM AND METHOD FOR MULTIPLE TIMING MASTERS IN A NETWORK

PRIORITY CLAIM

This application claims priority to pending European Application No. 09168391.2 filed on Aug. 21, 2009.

BACKGROUND OF THE INVENTION

1. Field of the Invention

The invention relates to a communication system, ports of a communication system and a method for managing a communication system. In one preferred embodiment, the invention relates to a synchronous communication system formed as a ring network of two or more communication ports coupled in daisy chain fashion to one another to allow communication.

2. Description of the Related Art

The following descriptions and examples are given as background only.

A communication system is generally known as a system that permits communication between nodes interconnected by a transmission line. Each node can transmit and receive information across the transmission line. A communication system of interconnected nodes can be organized in various topologies, such as a bus, ring, star, or tree topology or a combination thereof.

A bus topology network is generally regarded as linear. Transmissions from one node propagate along the transmission line and are received by all other nodes connected to that bus. A ring topology network, however, generally consists of a series of nodes connected to one another by unidirectional transmission links to form a single, closed loop. Examples of a ring network are described in IEEE 802.5 and Fiber Distributed Data Interface (FDDI).

The transmission line between nodes can be either wired (for example, copper wire, fiber optic, etc.) or a wireless transmission medium may be chosen for the transmission line, respectively.

For real-time applications, or for transferring synchronous streaming data, it is desirable for the communication system to have a low latency and a low transmission overhead. In addition, it is often necessary to synchronize clocks between nodes and to further provide a time reference for all nodes in the communication system.

U.S. Pat. No. 5,907,685 discloses a method of time synchronization between network nodes based on extensive bidirectional communication. The bidirectional communication disclosed in U.S. Pat. No. 5,907,685 causes a significant load on the network, when done regularly in short intervals. Furthermore, there is significant computing power required to evaluate the communicated data. For timing synchronization, a lead computer distributes the timing information to other nodes in the network. For this purpose, the role of lead computer must be assigned to a specific computer in the network. In most networks, computers are often attached to or removed from the network. When this occurs in the communication system disclosed in U.S. Pat. No. 5,907,685, it may be possible that two or even more computers are assigned the role of lead computer for distributing timing information. No method is disclosed in U.S. Pat. No. 5,907,685 for identifying multiple lead computers in the network.

SUMMARY OF THE INVENTION

The following description of the objective of the disclosure and various embodiments of communication systems, network nodes and methods is not to be construed in any way as limiting the subject matter of the appended claims.

An objective of the disclosure set forth herein is to provide a method of distributing a common real-time clock over a network having a ring topology to a plurality of network nodes with minimal time variations between the individual nodes. Another objective of the disclosure is to ensure that there is only one timing reference in a network. Meeting these objectives will ensure that the requirements of memory and processing power will be small.

According to one embodiment, a communication system is provided herein comprising a plurality of network nodes interconnected by a transmission line to form a network. In general, each of the plurality of network nodes may include a first communication port, which is configured to generate at least one frame including at least: a preamble for marking the beginning of the at least one frame, a data field and a time count field. The at least one frame includes a predetermined number of bits, wherein the number of bits per frame is preferably constant. Furthermore, the first communication port includes means for inserting timing information, like a time counter value, into the time count field.

The network node further includes a second communication port, which receives data from the transmission line. The second communication port preferably includes a frame buffer and decoder for storing frames and for disassembling the frames (or at least parts thereof). When receiving data, the second communication port may first synchronize the data on a preamble, if available.

Furthermore, the network node includes means for comparing timing information from the time count field with the information of the last time count field, which has been transmitted or is still being transmitted. If the time count fields are not identical, there must be another timing master on the network, and accordingly, an arbitration mechanism is triggered to resolve this conflict.

Preferably, the first communication port has a stable clock for generating the frame bits and a time counter for counting the number of generated frames. The stable clock may be synchronized to a reference clock generator, such as a crystal oscillator or an audio or video source. In one preferred embodiment, a PLL is used for this purpose.

In addition to the time counter value, a time count checksum value may be contained in the time counter fields or in a control field appended to the end of a frame. Preferably, the time count checksum is contained in the last of a set of n frames. This checksum is calculated over the time counter fields of a set of n frames or a subset thereof. The second communication port would only update its received time counter when a valid time count checksum has been received. In this case, the time count check sum may also be evaluated for identifying whether there is a second timing master on the network.

In general, the time counter is preferably configured for counting frames, but it may also count other entities. Such entities may be bits or bytes transmitted onto the network. Even absolute or relative time intervals like seconds, milliseconds or microseconds may be counted. In one specific embodiment, the time counter may be configured for counting individual bits, and the size of the frames may vary.

In a further embodiment, the network node divides the bit value of the time counter into a predetermined number of n segments and places each segment into the time count field of n consecutive frames. In this embodiment, the second communication port is configured to reassemble the value of the time counter by evaluating the time count field of n consecutive frames.

In a further embodiment, the network node generates at least one frame having a unique network node ID. In some cases, the network node ID may include a unique number. However, it may not be absolutely unique, in all cases, and may instead be a number having a high probability to be unique. For the very small probability of two network nodes as timing masters transmitting frames having the same value in the time count field, both nodes would receive what they transmit. Accordingly, each node would erroneously determine that they were the sole timing master in the network. However, including unique IDs within the frames enables each node to identify that a received frame was transmitted by a different node, and therefore, enables the node to determine that there is another timing master in the network. A suitable unique ID may be a 16 Bit value, which may be part of the data field or the time count field. It may be a value, which is programmed into the network node at production time, or a value generated by a random number generator in the network node.

The communication system disclosed herein includes at least a pair of communication ports, as described above. However, the communication system preferably includes a higher number of communication ports than specifically illustrated herein. A small number of communication ports is disclosed solely for the sake of brevity.

According to one embodiment, a method is provided herein for transmitting time count information over a communication system and for detecting at least a second timing master on the communication system. In general, the method may include generating at least one network frame including timing information, receiving at least parts of the network frame, while other parts of the network frame are transmitted, comparing the received time information with the time information which has been transmitted, and identifying the existence of at least a second timing master, if the received time information and the transmitted time information are not identical. The network frames preferably contain a preamble for marking the beginning of a frame, a data field and a time count field. The time count field preferably contains only 1/n of the number of bits representing a stored number of transmitted frames, while n consecutive time count fields represent the stored number of transmitted frames.

According to another embodiment, a method for transmitting time count information over a communication system includes the following steps: generating time count information by counting time, bits, bytes or the number of transmitted frames, generating a set of n frames and transmitting the set of n frames on the communication system. As indicated above, each of said n frames preferably includes at least a preamble for marking the beginning of a frame, a data field and a time count field. The time count field preferably contains only 1/n of the number of bits representing the time count information, while n consecutive time count fields represent the time count information.

According to yet another embodiment, a method for receiving time count information over a communication system includes receiving a set of n frames, wherein each frame includes at least a preamble for marking the beginning of a frame, a data field and a time count field containing only 1/n of the number of bits representing a stored time count information, while n consecutive time count fields represent the stored time count information. In addition to the receiving step, the method also includes storing the n consecutive time count fields of a consecutive set of n frames, and assembling received time count information from the n received time count fields.

The embodiments described herein allow easy resynchronization after a maximum of approximately 2*n frames, typically within 2*n−1 frames, even if a time reference is completely lost or a new communication port is connected to the network. If resynchronization has started just after the second frame of a set of n frames has been transmitted, the second communication port should wait until it can receive a full set of n frames starting with the first frame of this set. With an optimized recognition procedure, the time for resynchronization may even be reduced to n frames. In addition, the overhead for transferring time and/or time count information is very low, as each frame contains only 1/n of the full time information.

The embodiments described herein also allow extremely precise long time synchronization to be performed. On one hand, long time synchronization may be achieved by transferring time counter values, which may also contain time of day values with high resolution. Such a high resolution simplifies the detection of another timing master on the network, as the probability increases that different timing masters will have different time references, and therefore, transfer different time information over the network.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1:
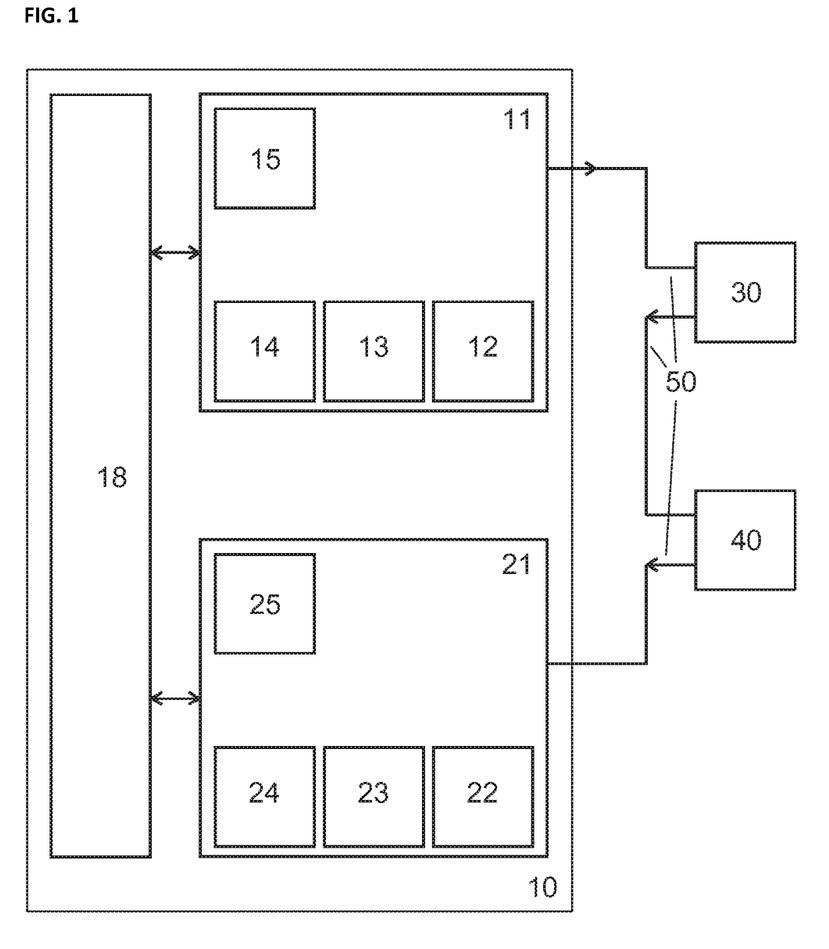
FIG. 1 is a block diagram illustrating one embodiment of a communication system comprising network nodes.

Turning now to the drawings, FIG. 1 illustrates a communication system according to a preferred embodiment. As shown in FIG. 1, the communication system may include a first network node 10, a second network node 30 and a third network node 40, which are connected via network transmission lines 50 to form a ring network. Although three network nodes are illustrated in FIG. 1, a communication system in accordance with the preferred embodiment may include a greater or lesser number of network nodes connected to the network. At a minimum, the communication system or network includes at least two nodes, such as the first network node 10 and the second network node 30.

As shown in FIG. 1, the first network node 10 includes a first controller 18, which may host an application for exchanging data with other network nodes 30, 40. In one example, the application may be a video source, such as a camera. In addition to controller 18, the first network node 10 may include a first communication port 11 for transmitting frames onto network transmission lines 50, and a second communication port 21 for receiving frames from network transmission lines 50. The first communication port 11 may be alternatively referred to herein as a "transmitter" or "transmit port," and the second communication port 21 may be alternatively referred to herein as a "receiver" or "receive port."

In general, the first communication port 11 may include a framer 12 for generating frames (60, FIG. 2), a clock generator 15 for clocking frames transmitted onto the network lines 50, a time counter 13 for counting transmitted frames or other time information, and a transmit time count register 14 for storing a value of the time counter 13 for each n-number of frames. As described in more detail in reference to FIG. 2, framer 12 assembles the frames, so as to include at least a preamble 61, a time count field 62, and a data field 63. The time count field 62 in each frame 60 contains only part of the information received from the time counter 13 or the time count register 14.

The second communication port 21 may include a frame buffer and decoder 22, a receive time counter 23, receive time counter register 24 and a clock generator 25. The frame buffer and decoder 22 is configured for buffering and decoding the frames received from the network lines 50. The components of the second communication port 21 are clocked by the clock generator 25, which is preferably synchronized on the received frames or bits thereof. In some cases, the clock generator 25 may be identical to the clock generator 15 of the first communication port 11.

The receive time counter 23 is provided within the second communication port 21 for counting the frames received from the network transmission lines 50. The receive time counter register 24 assembles the time count information from n time count fields 62 received within n successive frames 60. The receive time count register 24 assembles the time count information, which has traveled over the network to nodes 30 and 40, and compares this value with the value stored in the transmit time count register 14 of the first communication port 11. If the values are identical, there is no other timing master on a network. If the values are different, one of the other network nodes 30, 40 may be operating as an additional timing master on the network.

In one embodiment, the first network node 10 is connected to a ring network and is configured to transmit timing information over the ring network. This first network node is designated as the timing reference for the network clock being used to transfer data over the network. In addition to data, the first network node transmits data fields containing unique timing information. When the first network node transmits at least one frame of data having timing information through a transmit port 11, it receives the same data at it's receive port 21, albeit delayed for the propagation time around the ring network. It is essential that the overall time delay for data traveling around the ring network is shorter than the length of one frame of data. This ensures that the first network node 10 acting as a timing master can receive at least parts of the same frame it is currently transmitting.

To check for the existence of other timing masters, the first network node 10 compares the timing information received at the receive port 21 with the timing information which has been sent by the transmit port 11. If the transmitted timing information is identical to the received timing information, there is no other timing master in the network. For instance, if there were at least a second timing master on the network, the second timing master would overwrite the timing information with its own timing information before forwarding the received frame on the network. Since there is a high probability that the timing information of the second timing master would be different from the timing information of the first timing master, the first network node 10 would receive different timing information than it transmitted if a second timing master was connected to the network. If the first network node 10 receives different timing information, the first network node knows that there is at least one additional timing master on the network, transmitting timing information. When this determination is made, an arbitration mechanism can be triggered to resolve the timing master conflict.

This method can be continuously applied to every data frame being transmitted by the timing master. Accordingly, it is possible to identify recently inserted network nodes taking over the function of the timing master.

If the overall delay of frames over the network is longer than the time needed to transmit one network frame, the size of the network frames should be lengthened, so that the first network node acting as timing master can receive at least a portion of the frame it is currently transmitting to verify that it is the same frame. If there is a significant time delay in frames being transmitted over the network, the first network node cannot ensure that a frame being received is identical to the frame being transmitted by the first network node.

As but one advantage, the method described herein requires no additional information about the function of the network node acting as timing master, and therefore, no additional space in the frame is occupied for verifying that there is only one timing master in a network. Other advantages may become apparent in light of the description provided herein.

Figure 2:
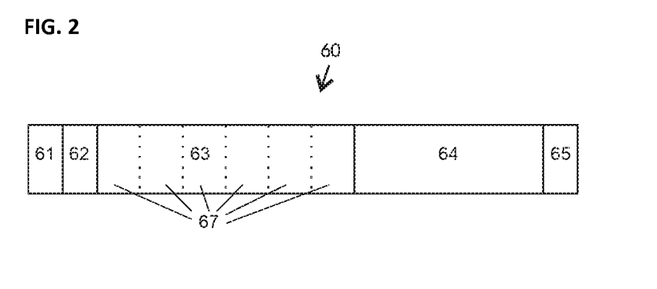
FIG. 2 is a block diagram illustrating an exemplary data frame.

FIG. 2 illustrates one embodiment of an exemplary data frame 60 that may be transmitted over a network. As shown in FIG. 2, frame 60 includes at least a preamble 61, which identifies the beginning of a frame, and may contain additional synchronization bits. The frame 60 also includes a time count field 62 containing time count information derived from a transmit time counter 13. In general, the time count information may be any time related counter value, such as time in milliseconds, microseconds or even a numerical count of transmitted bits, bytes or network frames. The time count field 62 may only be modified by a timing master. All other network nodes in the network may only read the contents thereof.

The frames 60 may contain other fields in addition to preamble 61 and time count field 62. For instance, fields 63 and 64 are typically included for transferring synchronous data and asynchronous data, and thus, may also be referred to as the payload of the frame. In some embodiments, fields 63 and 64 may be divided into bit groups 67. At the end of the frame 60, control bits 65 are inserted and may contain at least a checksum and additional information.

Figure 3:
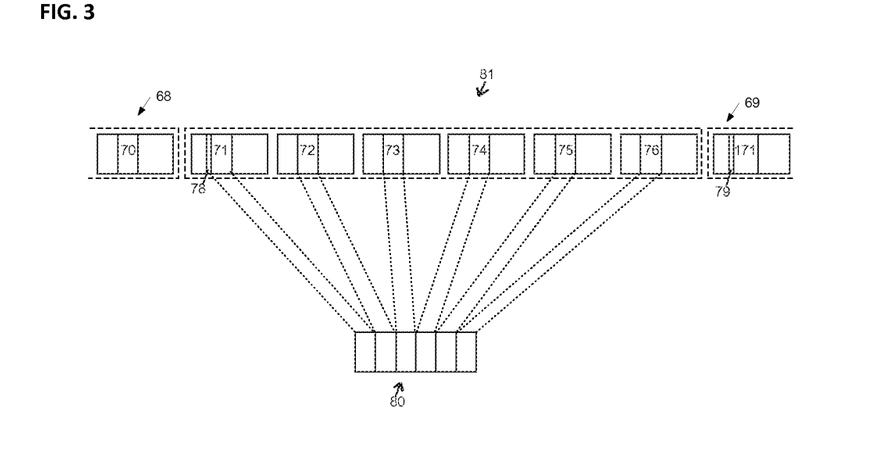
FIG. 3 is a block diagram illustrating a plurality of frames carrying time count information.

In FIG. 3, a sequence of frames containing time count fields 70-77 having time count information stored therein is illustrated in accordance with one embodiment. Time count field 70 belongs to a first set of frames 68, of which only the last frame in the set is shown in FIG. 3. The six time count fields 71 to 76 belong to a second set of frames 81. The time count field 171 belongs to a third set of frames 69, of which only the first frame in the set is shown in FIG. 3. The beginning of the second set of frames 81 is marked by the time count start identifier 78, which may be a coding violation, while the beginning of the third set of frames 69 is marked by the time count start identifier 79.

Referring to FIGS. 1 and 3, the six values contained within the time count fields 71 to 76 are assembled together by the second communication port 21 into the receive time counter register 80, which corresponds to the time counter register 14 shown in FIG. 1. If only one timing master exists on the network, the value stored within the receive time counter register (80, 14) should be identical to the time counter value transmitted by the first communication port 11.

As discussed above, time counter 13 is provided within the first communication port 11 for counting the generated frames 60. In a preferred embodiment, the bit value of the time counter 13 is segmented into a predetermined number (n) of segments, preferably having a constant size of m-bits. The number 'm' may be substantially any number, although it may be preferred that the number 'm' is between 4 and 16. In one example, the number 'm' may be 8 or 16. Preferably, the size of the time count field 62 is also m-bits.

Once the bit value of the timer counter 13 is segmented into the predetermined number (n) of segments, individual segments are inserted into the time count fields 62 of 'n' consecutive frames 60. Accordingly, after n frames, the complete bit value of the transmit time counter 13 will be packed into n frames 60 and forwarded onto the network. Preferably, the frames 60 are of constant size. The n frames 60 containing the complete bit value of one time counter 13 are referred to herein as a set of n frames 81. Each set of n frames 81 contains a different time counter value. Accordingly, the sets of n frames 81 are unique. These frames are assembled, for example, by a framer 12 included within the first communication port 11. After each frame is assembled, e.g., by the framer, the frame is transmitted by the first communication port 11 via the transmission line 50.

The second communication port 21 is generally configured for decoding the time count fields 62 of consecutive frames 60, and reassembling the time counter value after receiving a set of n frames. For this purpose, the second communication port 21 preferably includes a receive time counter 23 and a receive time counter register 24, in which the values of the time count fields 62 of n consecutive frames 60 are transferred. After receiving a set of n frames 60, the receive time counter register 24 will contain the last transmitted time counter 13 value, or in other words, a value corresponding to the time counter 13 at transmit time. From this value, the transmit time can be derived as the frames 60 are of known size and known bit rate. The received time counter value is delayed against the transmitted time counter value for some amount of time. Typically, the time delay is n frames in addition to some internal processing delays associated with the first and the second communication ports and the propagation delay of the n frames over the network. Such a delay may be added to the calculated time from the received time counter values to generate a precise real time reference. However, it may not be necessary to generate a precise real time reference in all cases. For a video transmission, for example, a precise relative time reference may be sufficient, as the video signals travel over the network and are therefore delayed for the same amount of time as the time counter value signals in the time counter fields 62 of frames 60.

In the embodiment described above, a set of n frames must be evaluated or compared to verify that the transmitted timing information is identical to the received timing information. Alternatively, only the frame containing the least significant bits of the timing information may be evaluated.

The transmit time counter 13 may be preset to any value. Specifically, when starting up communication, the transmit time counter 13 may be set to a value representing the time of day, a master time reference or to any other number like zero. In some embodiments, the transmit time counter 13 may also be preset during operation, for example, when there is a significant difference between the transmit time counter value and the actual time of day or the master time reference.

Preferably, the time counter 13 of the first communication port 11 is incremented just before the first segment of the counter value (e.g., segment 71 of FIG. 3) is assembled into a frame. Accordingly, the time counter 13 is incremented every frame for n frames and represents 1/n of the frames transmitted. If the time counter 13 is incremented each frame 60, a latch should be included, so that the time counter value will not be transmitted until the counter value is incremented to account for all n frames. The time counter register 14 holds the counter value prior to assembly of the first counter value (e.g., segment 71) into a frame 60. After the time counter 13 is incremented for n frames, the value stored in the time counter register 14 is used for a set of n frames 81.

In another embodiment, the time counter 13 of the first communication port 11 is incremented n counts just before the first segment of the counter value (e.g., segment 71 of FIG. 3) is assembled into a frame, and the assembly of a set of n frames begins. In this embodiment, the time counter 13 is incremented n counts to account for all n frames and represents the number of the frames transmitted. Between individual frames of a set of n frames 81, the time counter 13 should not be incremented, as this would scramble the value.

Preferably, the time count fields 62 in the frames may contain parts of a binary or BCD encoded counter value.

Preferably, the second communication port 21 comprises a stable local clock 25 for synchronizing its receiver on the bits transferred over the network. Preferably, the stable local clock 25 comprises a PLL to synchronize a local oscillator to the bits transferred over the network. This local oscillator preferably has a higher frequency than the bit frequency of the bits transferred over the network.

Figure 4:
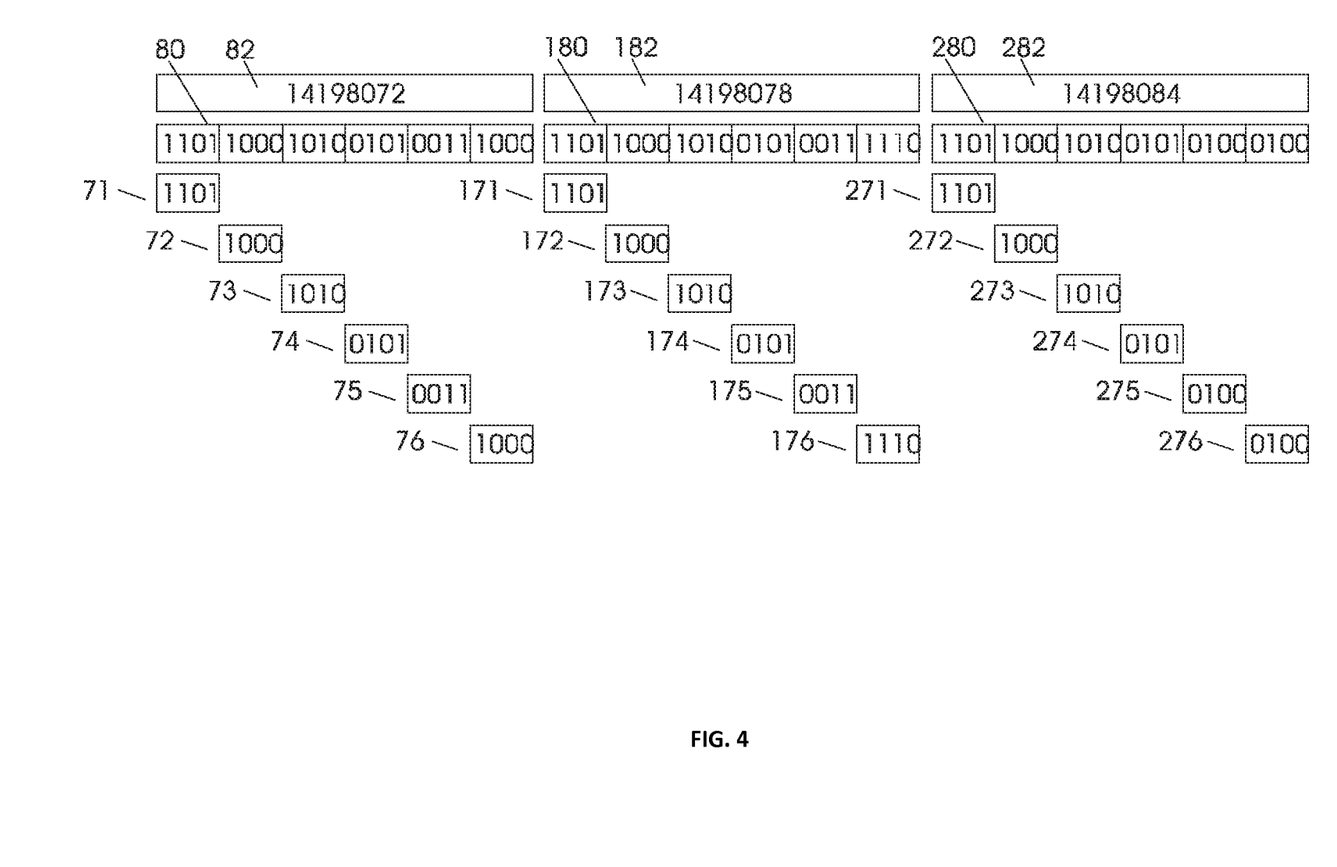
FIG. 4 illustrates one manner in which time counter values may be assigned to the time count fields of individual frames.

FIG. 4 illustrates the assignment of time counter values to the time count fields of individual frames in more detail. In this example, the time counter values are shown in three different states. In the first time counter value 82, before transmission of the second set of frames, the time counter has a count of 14198072. Preferably, this value is stored in memory. The binary representation of this number (1101 1000 1010 0101 0011 1000) is divided into n=6 packets, wherein each packet is of four bits length. The individual packets are inserted into the time count fields 71-76 of six consecutive frames and transmitted to a receiver. The receiver successively receives the packets of four bits length and stores them into the receive time counter register 80. After a full set of frames (6 frames in this example) has been received, the contents of the receive time counter register 80 is again the binary representation of the counter value 82 of the time counter. Preferably, means of frame synchronization, like control bits, are provided to indicate the first time count field of a set of frames.

After a full set of frames has been received, the receiver will have the same time counter value as the time counter value at the time starting the first frame of the second set of frames. From this time counter value, real time information may be derived. To get precise time information, the delay caused by transmission of the full set of frames and the run time delay of the network components starting from the transmitter to the receiver may also be considered.

After the transmitter has transmitted the first set of frames, it increases the time counter by the number of transmitted frames, which in this example equals to six. It is obvious that the time counter can be increased by any predetermined value corresponding to the number of transmitted frames. In the example, however, the new time counter value 182 is increased by six to 14198078. Again, the binary representation of the time counter 182 value (1101 1000 1010 0101 0011 1110) is stored in memory and sent over the network as six individual time count fields 171-176 within a second set of frames. These frames are again received by the receiver and assembled to the binary value stored in the receive time counter register 180. The same applies to the third set of frames, starting with the next time counter value 282, which is again increased by 6. Again the binary representation of this counter value is stored in memory and sent over the network as six individual time count fields 271-276, which are again reassembled by a receiver into the receive time counter register 280.

Instead of using control bits for identifying the first time count field of a set of frames, the receiver may compare the bit groups of time count fields of individual frames. In a first step, the time count fields of frames being n frames distant from each other are compared (wherein, as noted above, 'n' is the number of frames in a set of frames). To illustrate a first embodiment, we will assume that n is less than $(2^m)$, which represents the maximum number of states which can be represented by a time count field of m bits per frame. In our example of a four bit time count field (m=4), the maximum number of states is 16. Accordingly, n is less than 16 in this first embodiment.

When comparing time count fields being n frames apart, which are six frames apart in our example, the least significant time count fields 76, 176, 276 will change values if $n<(2^m)$. For example, and as shown in FIG. 4, the least significant time count field 76 in the first set of frames has the value 1000. The least significant time count field 176 in the second set of frames, being six frames apart from time count field 76, has the value 1110. Likewise, the least significant time count field 276 in the third set of frames, being another six frames apart, has the value 0100. In contrast thereto, the higher order time count fields, specifically the most significant time count fields 71, 171, 271, which are also six frames apart, remain unchanged.

The receiver assembles the time count fields (e.g., 171-176) of each set of frames into the time count register (180) starting with the most significant time count field 171, having unchanged bits over the time count field 71, and ending with the least significant time count field 176. As comparison between time count fields 176 and 76 show that the bits contained therein have changed, such comparison identifies the start of a subsequent set of frames. In some cases, not only the bits of the least significant time count field changes, but also bits of higher significance time count fields may change, such as the time count field 275 shown in the example of FIG. 4. The described method still works in this case. For the rare case, that 6 successive time count fields change, the identical set of time count fields is skipped and the method is repeated for the next 6 time count fields.

For the case that n is equal to or greater than $(2^m)$, the least significant time count fields may not change. If, for example, 16 frames belong to a group of frames, the bits of the 15th frame may change, while the bits of the 16th frame remain unchanged. This has to be considered by assembling the frames into the receive time counter register.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

It will be appreciated to those skilled in the art having the benefit of this disclosure that this invention is believed to provide networks and parts thereof. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A network node configured as a timing master in a ring bus network, the network node including:
    a first communication port configured for generating at least one frame comprising at least a preamble, a data field, and a time count field containing time count information, and for transmitting said at least one frame onto the ring bus network;
    a second communication port configured for receiving said at least one frame, comparing a received time count field with said time count field generated by the first communication port, and signaling the presence of at least another timing master on the ring bus network, if the compared time count fields are not equal; and
    wherein a propagation delay associated with the at least one frame traveling around the ring bus network is less than a length of said frame, so that the second communication port receives at least parts of said frame while the first communication port is transmitting said frame.

2. The network node according to claim 1, wherein the first communication port comprises a time counter configured for generating the time count information for the time count field by counting one of frames, bytes, bits, or time intervals.

3. The network node according to claim 2, wherein the first communication port divides a bit value of the time counter into a predetermined number (n) of segments and places each segment into the time count field of n consecutive frames.

4. The network node according to claim 3, wherein said second communication port is configured for reassembling the bit value of the time counter by evaluating the time count fields of the n consecutive frames.

5. The network node according to claim 3, wherein at least one frame of the n consecutive frames contains a time count checksum for the time count fields contained therein.

6. The network node according to claim 3, wherein at least one frame of the n consecutive frames contains a unique ID value.

7. The network node according to claim 1, wherein the first communication port further comprises a stable clock for generating the at least one frame, and wherein the stable clock is synchronized to a reference clock source selected from a group comprising a crystal oscillator, an audio source and a video source.

8. A method for detecting multiple timing masters on a ring bus network including the steps of:
    generating time count information associated with a set of frames, wherein the time count information is generated by counting time, bits, bytes or a number of generated frames;
    generating the set of frames, wherein each frame in the set includes at least a preamble for marking the beginning of the frame, a data field and a time count field representing a portion of the time count information;

transmitting the generated frames on the ring bus network as the set of frames is being generated;

receiving the transmitted frames after each frame travels around the ring bus network;

comparing a time count field in a received frame with a time count field in a frame being transmitted; and detecting multiple timing masters on the ring bus network if the received time count field and the transmitted time count field are different.

9. The method according to claim 8, wherein the step of generating the set of frames comprises dividing the time count information into a predetermined number (n) of segments, and placing the n segments into the time count fields of n consecutively generated frames, so that each time count field contains only 1/n of a total number of bits representing the time count information, while n consecutive time count fields represent the time count information.

10. The method according to claim 9, further comprising assembling n received time count fields into a received time counter value.

11. A communication system comprising a plurality of nodes interconnected by a transmission line to form a network, wherein each of the plurality of nodes comprises:

a first communication port configured for generating at least one frame comprising a preamble, a data field, and a time count field containing time count information, and for transmitting said at least one frame onto the transmission line for propagation through the network; and a second communication port configured for receiving said at least one frame, comparing a received time count field with said time count field generated by the first communication port, and signaling a presence of at least two timing masters on the network, if the compared time count fields are not identical.

12. The communication system according to claim 11, wherein a propagation delay associated with the at least one frame propagating around the network is less than a length of said frame, so that the second communication port receives at least a portion of said frame while the first communication port is transmitting said frame.

13. The communication system according to claim 11, wherein the first communication port comprises:

a framer for generating a plurality of frames;

a clock generator for clocking said plurality of frames onto said transmission line;

a transmit time counter for generating time count information associated with a set of n consecutively generated frames; and a transmit time count register for storing a value of the time counter for the set of n consecutively generated frames.

14. The communication system according to claim 13, wherein the framer is configured for assembling the plurality of frames, so that each frame in a set of frames includes at least a preamble, a time count field, and a data field, and wherein the time count field in each frame contains only a portion of the time count information generated by the time counter for each set of frames.

15. The communication system according to claim 14, wherein the second communication port comprises:

a frame buffer and decoder for buffering and decoding frames received from the transmission line;

a receive time counter register for assembling the time count information from each set of received frames; and means for comparing a value of the assembled time count information with the value stored in the transmit time count register of the first communication port.

16. The communication system according to claim 15, wherein if the values stored in the transmit and receive time counter registers are identical, said means determines that there is only one timing master on the network.

17. The communication system according to claim 15, wherein if the values stored in the transmit and receive time counter registers are not identical, said means determines that at least two of the plurality of network nodes are operating as timing masters.

* * * * *